Patented Oct. 1, 1929

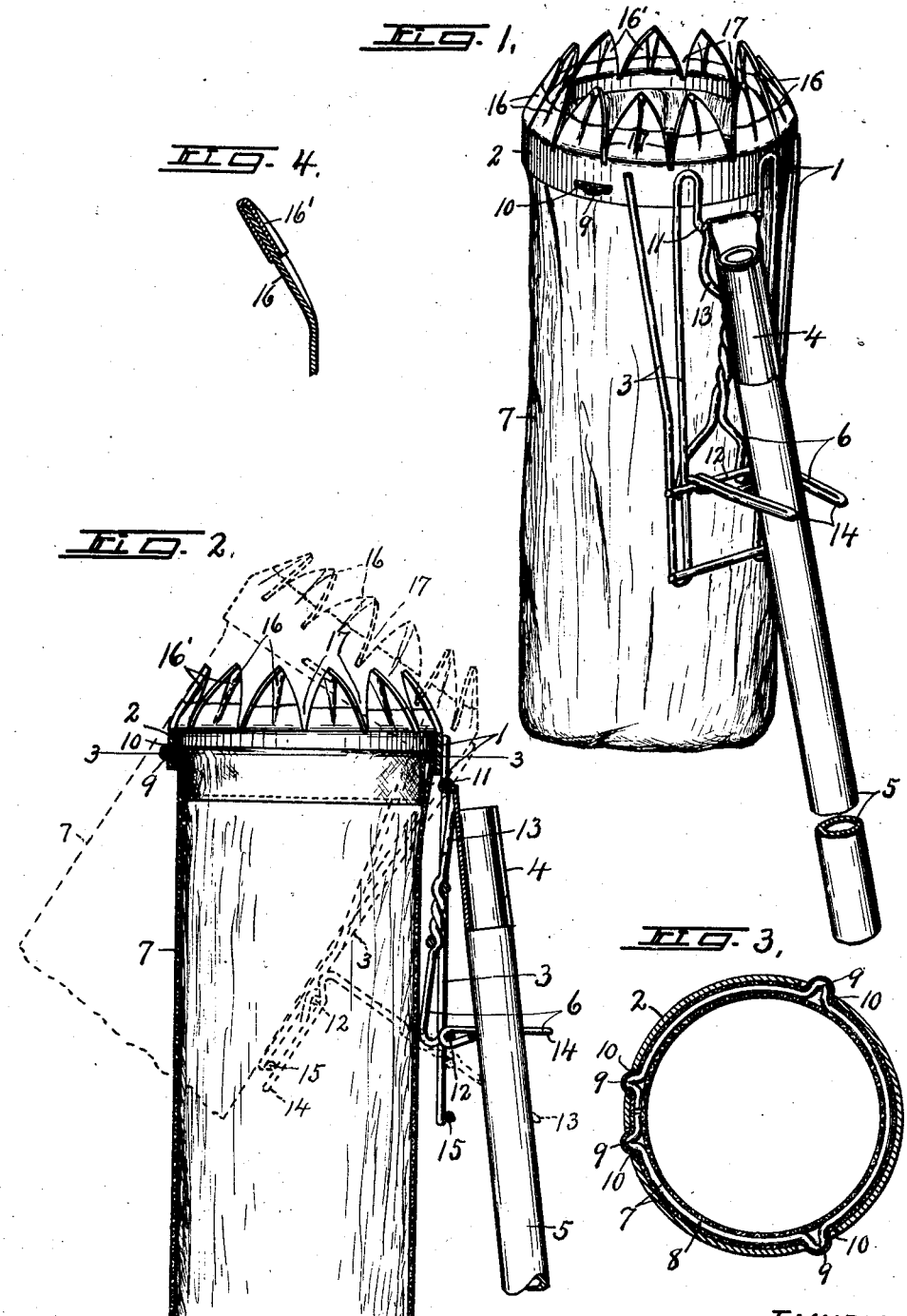

1,729,762

UNITED STATES PATENT OFFICE

MELVILLE CLARK, OF SYRACUSE, NEW YORK

FRUIT PICKER

Application filed August 16, 1927. Serial No. 213,295.

This invention relates to a fruit picker of the class set forth in Patent No. 1,034,989, August 6, 1912, in that it comprises broadly a hollow fruit detaching head mounted on a suitable handle and provided with a flexible receiver into which the detached fruit is precipitated.

It has been found, however, that when the head and handle are rigidly attached to each other it is not always possible to bring the head at the desired angle for removing the fruit from different portions of the tree by reason of more or less obstruction by the limbs and twigs and one of the objects of the present invention is to connect the head and handle in such manner that they may be relatively adjusted to different angles as may be required to bring the receptacle into proper relation to the fruit for detaching the same from the tree.

Another object is to simplify the construction of the head and means for attaching the flexible receptacle thereto.

Other objects and uses relating to specific parts of the device will be brought out in the following description.

In the drawings:

Figure 1 is a perspective view of a fruit picker embodying the various features of my invention.

Figure 2 is a longitudinal sectional view of the same, the lower portion of the handle being broken away while the head and flexible receiver mounted thereon are shown by dotted lines as adjusted to a different angle than that shown by full lines.

Figure 3 is a transverse sectional view taken in the plane of line 3—3, Figure 2.

Figure 4 is a detailed sectional view through a portion of one of the teeth of the serrated picker-ring showing the protective coating on the points thereof.

As illustrated, this device comprises a picker head —1— consisting of a ring —2— of relatively thin bendable sheet metal and a pendant extension frame —3— of wire eccentrically secured to the peripheral wall of the ring to extend downwardly some distance therefrom for receiving and supporting a ferrule —4— on the upper end of a handle —5— and also adapted to receive and support a prop —6— in a manner and for a purpose presently described.

A flexible receptacle —7— is fastened at its upper open end to a ring —8—, Figure 3, said ring being divided transversely and tensioned to expand against the inner walls of the head —2— and is provided at intervals with outwardly projecting lugs —9— which, together with the outer adjacent portions of the fabric receptacle —7— extend into registering apertures —10— in the peripheral wall of the head —2— to hold the ring and its bag —7— and the tubular head —2— against relative axial movement.

The adjacent ends of the ring —8— at the division are normally spaced a sufficient distance apart to permit the ring to be sprung inwardly and detached from the head —2—, when desired.

The upper end of the ferrule —4— of the handle —5— is pivoted to a cross bar —11— on the upper end of the pendant extension —3— of the head —2— to permit the head and handle to swing relatively to each other to different angles as may be required for manipulating the head to different positions for detaching the fruit from the tree.

The prop —6— for holding the head —2— and handle —5— at different angles relatively to each other is pivoted to a cross bar —12— on the pendant extension —3— between the lower and upper ends thereof and is provided with forked arms —13— and —14— projecting in different directions from the pivot —12— at substantially right angles to each other to form separate rests for the handle —5—.

The forked arm —13— is somewhat longer than the forked arm —14— corresponding approximately to the distance between the upper and lower cross bars —11— and —12— so that when swung to one position as shown by full lines in Figure 2 its upper end will engage the cross bar —11— as a limiting stop therefor.

The other forked arm —14— is substantially rigid with the arm —13— and when the prop is rocked outwardly and downwardly from the position shown by full lines in Figure 2 the outer end of the arm —14— will engage an underlying cross bar —15— on the lower end of the extension —3— to limit said movement as shown by dotted lines in Figure 2.

That is, when the prop —6— is adjusted to the position shown by full lines in Figure 2 with the handle —5— in engagement with the shorter rest —6— the axes of the head —1— and handle —5— will be at a slight angle only to each other or more nearly parallel but when it is desired to increase this angle the prop —6— will be adjusted to the position shown by dotted lines to bring the short arm —14— into engagement with the stop —15— and the longer arm into engagement with the handle thereby holding said head —1—. The arm —5— may be held at a slightly greater angle by adjusting the prop —6— so that its forked arm —13— may lie in a plane at substantially right angles to the axis of the handle —5—.

The prop is preferably pivoted to the extension —3— in such manner as to be frictionally held in any position of adjustment thus permitting a wide range of adjustment of the head —2— and handle —5— relative to each other with the assurance that the prop will remain in its adjusted position.

The head —2— is provided with a circumferential series of upwardly projecting tapered teeth or cutters —16— forming intervening downwardly tapered slots —17— which are sufficiently narrow at the bottom to receive the stem of the fruit so that when the head —2— is manipulated to receive a fruit unit therein, it may also be operated to cause the stem to enter one or the other of the notches or slots —17—, whereupon a slight turning movement or downward pull at an angle to a vertical plane of the unit will detach the latter from the tree and cause it to fall into the receptacle —7—.

As previously stated, the teeth —16— are bendable and normally deflected inwardly to reduce the width of the slots 17, particularly at the base, according to the size of the stem and nature of the fruit to be picked.

The points or tips of the teeth of the picker-ring are provided with a coating 16' of tar or equivalent plastic material capable of hardening when cold, formed by dipping the ends of the teeth in liquid tar or equivalent substance to form protective shields for preventing mutilation of the fruit by the metal teeth in the operation of removing the fruit from the tree, i. e. the edges of the metal teeth are in some instances too sharp and harsh to avoid mutilation of the fruit without some protective medium, and it is for this purpose that the points of the teeth are dipped in plastic material to blunt or round the edges thereof, and thereby avoid the cutting of the fruit in case the points of any one of the teeth should be accidentally forced against the same.

It will be observed that the ferrule —4— is split longitudinally through one side, the purpose of which is to permit it to be enlarged or contracted radially to conform to handles of different sizes.

The device shown and described is particularly simple and efficient in operation, and may be made and sold at a comparatively low cost, but it is evident that various changes may be made in the structural details of the various parts without departing from the spirit of this invention.

What I claim is:—

1. In a fruit picker, a tubular picker-head part, and a handle part pivoted to each other for relative adjustment to different angles, and a prop mounted on one of the parts and adjustable to different positions for holding said parts at different angles.

2. In a fruit picker, a tubular picker-head part, and a handle part pivoted to each other for relative adjustment to different angles, and a prop pivoted to one of the parts and provided with separate rests at different distances from the pivot and adjustable to engage either rest with the other part.

3. In a fruit picker, a head part having an opening to permit the passage of fruit therethrough and a flexible receiver for the fruit attached to the head part, a handle part pivoted to the head part, and a prop pivoted to the head part and provided with separate handle rests at different distances from its pivot and at an angle to each other, said prop being adjustable about the axis of its pivot to engage each rest with the handle independently of the other rest.

In witness whereof I have hereunto set my hand this 13 day of August, 1927.

MELVILLE CLARK.